United States Patent [19]

Eustace et al.

[11] 4,416,960
[45] Nov. 22, 1983

[54] LI/TIS$_2$ CURRENT PRODUCING SYSTEM

[75] Inventors: Daniel J. Eustace, Scotch Plains; Bhaskara M. L. Rao, Fanwood, both of N.J.

[73] Assignee: Exxon Research and Engineering Co., Florham Park, N.J.

[21] Appl. No.: 184,772

[22] Filed: Sep. 8, 1980

Related U.S. Application Data

[63] Continuation of Ser. No. 115,997, Jan. 28, 1980, abandoned.

[51] Int. Cl.$^3$ .............................................. H01M 6/14
[52] U.S. Cl. .................................... 429/194; 429/197
[58] Field of Search ....................... 429/194, 197, 218

[56] References Cited

U.S. PATENT DOCUMENTS

| | | | |
|---|---|---|---|
| 3,947,289 | 3/1976 | Dey et al. | 136/154 |
| 4,071,665 | 1/1978 | Garth | 429/197 |
| 4,084,045 | 4/1978 | Kegelman | 429/194 |
| 4,086,403 | 4/1978 | Whittingham | 429/194 |
| 4,104,451 | 8/1978 | Klemann et al. | 429/194 |
| 4,252,876 | 2/1981 | Koch | 429/197 |

Primary Examiner—Charles F. LeFevour
Attorney, Agent, or Firm—Robert S. Salzman

[57] ABSTRACT

An improved electrolyte for an Li/TiS$_2$ current producing system, such as a battery, features at least one lithium solute of the general formula LiXF$_a$, where X is selected from a group consisting of B, P, Sb, and As, and wherein a is 4 for B and 6 for P, Sb, and As. The solute(s) are supported in a solvent consisting of at least 1,3 dioxolane, and more particularly in a mixture of 1,3 dioxolane (DIOX) and 1,2 dimethoxyethane (DME) ranging in percent ratios of (DIOX:DME) from 100/0 to 40/60 by weight.

9 Claims, 3 Drawing Figures

A$_1$ 1M LiAsF$_6$ Diox. DME (80:20 v/o)
   TiS$_2$ 10 mAH/Cm$^2$, 2 ANODE 1 CATHODE B$_1$ 1M LiAsF$_6$ Diox.
   TiS$_2$ 20 mAH/Cm$^2$, 1 ANODE 1 CATHODE

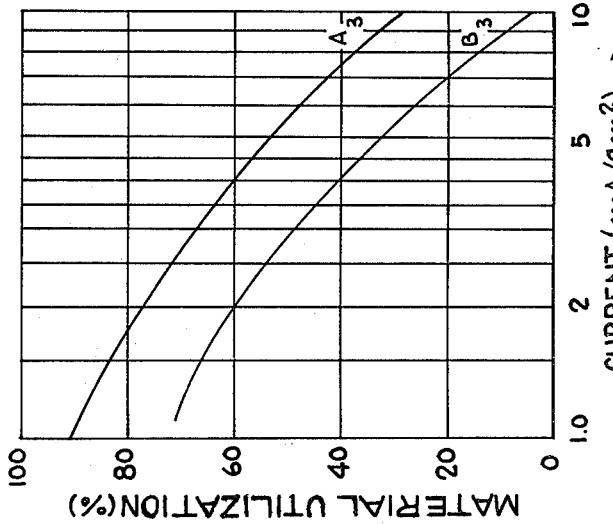
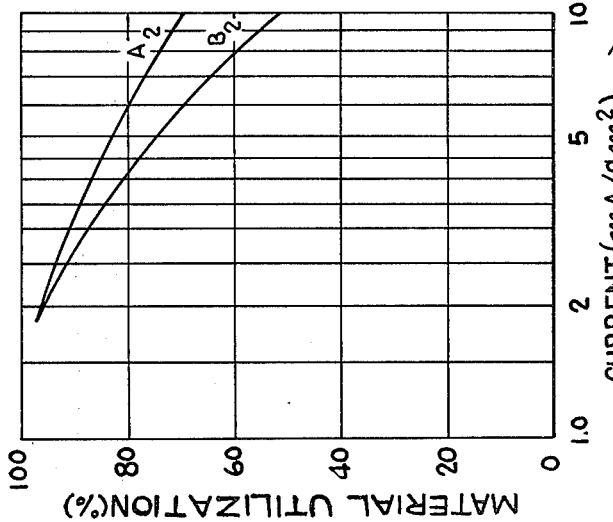
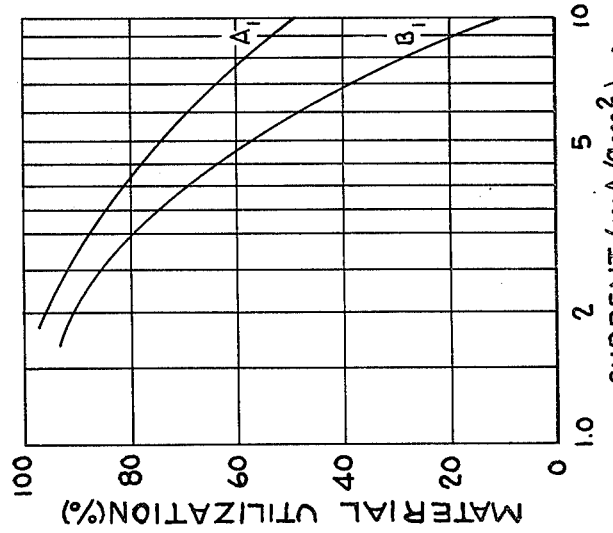
DISCHARGE SIGNATURE DATA FOR Li/TiS$_2$ CELL

LI/TIS₂ CURRENT PRODUCING SYSTEM

This is a continuation of application Ser. No. 115,997, filed Jan. 28, 1980 and now abandoned.

FIELD OF THE INVENTION

The invention pertains to current producing $Li/TiS_2$ systems, and, more particularly, to an improved electrolyte for these systems.

BACKGROUND OF THE INVENTION

In current producing $Li/TiS_2$ systems, such as batteries, an important objective is to provide electrolytes having high conductivity (low specific resistivity) and whose shelf life and stability during operation of the system are sufficiently useful. It is, however, quite difficult to predict in advance the probability of the successful performance of non-aqueous electrolytes with any particular electrode couple.

It has been suggested that an electrolyte consisting of a solvent mixture of dioxolane and 1,2 dimethoxyethane could be used with complex lithium salts such as lithium hexafluoroarsenate, lithium hexafluorophosphate, and lithium tetrafluoroborate in $Li/FeS_2$ battery systems. Such suggested electrolytes are to be found in the patent to: B. H. Garth, entitled "High Energy Density Battery with Dioxolane Based Electrolyte", U.S. Pat. No. 4,071,665, issued Jan. 31, 1978.

Similarly, it has been suggested that electrolytes of a similar character can be used in battery systems having an $Li/V_2O_5$ couple. Such battery systems are described in the patent to A. Dey et al, entitled "Mixed Solvents for High and Low Temperature Organic Electrolyte Batteries", U.S. Pat. No. 3,947,289, issued Mar. 30, 1976. A. Dey et al recognize that certain electrolyte solvent(s) may undergo a polymerization, which increases the electrolyte impedance, and thus dramatically reduces their usefulness. A. Dey et al suggest the use of inhibitors to improve the shelf life of these electrolytes.

In the patent to M. R. Kegelman, entitled "Galvanic Cells Employing Uncompressed Particles of FeS as the Cathode", U.S. Pat. No. 4,084,045, issued Apr. 11, 1978, it is suggested that electrolytes using complex salts of lithium in a solvent mixture of 1,3 dioxolane and 1,2 dimethoxyethane can be employed in cells of the Li/FeS type.

It has been likewise suggested that simple salts of lithium such as lithium bromide, lithium iodide, etc., can be used in a dioxolane and dimethoxyethane solvent mixture for an $Li/TiS_3$ electrochemical cell. Such a system is described in the patent to M. S. Whittingham et al, entitled "Alkali Metal/Niobium Triselenide Cell Having a Dioxolane-Based Electrolyte", U.S. Pat. No. 4,086,403, issued Apr. 25, 1978.

In an abstract (only an abstract available) to P. G. Gugla, entitled "Inefficiency Mechanisms in Plating and Stripping Lithium From a $LiAsF_6$ Dioxolane Electrolyte", Journal of the Electrochemical Society, 126(11), Nov. (1979), 714 RNP, it is recognized that side reactions occur between the $LiAsF_6$, dioxolane electrolyte and the lithium metal of the electrode, such that an insoluble lithium compound is formed resulting from dioxolane ring opening and water.

For use in the present current producing $Li/TiS_2$ system of this invention, the proposed dioxolane containing electrolytes are not predictably suitable based upon the aforementioned teaching of Gugla.

When the proposed electrolytes containing the complex salts of lithium in a dioxolane solvent were first used in the present inventive $Li/TiS_2$ system, certain instabilities were observed in particular situations in which starting materials and starting and storage conditions played an important part.

The use of these electrolytes in the inventive $Li/TiS_2$ system has been found to require that these electrolytes generally have an aqueous pH equal to, or greater than, 6.00 in order to prevent polymerization of the dioxolane solvent.

As a general rule, it is necessary to choose the various solutes and solvents for these electrolytes so that they have a high elemental purity, since the probability of polymerization of the electrolyte increases with the increase of acidic impurities.

BRIEF DESCRIPTION OF THE DRAWINGS

FIGS. 1a, 1b and 1c illustrate in graphic form the material efficiency realized for $Li/TiS_2$ cells with the use of the inventive electrolyte.

DETAILED DESCRIPTION OF THE INVENTION

In the search for high-rate electrolytes for $Li/TiS_2$ rechargeable cells, it has been found that the complex salts of lithium of the general formula:

$$LiXF_a$$

where X is selected from a group consisting of B, P, Sb and As, and where "a" is 4 for B and 6 for P, Sb and As, supported in a solvent consisting of at least 1,3 dioxolane, and, more particularly, in a solvent mixture of 1,3 dioxolane (DIOX) and 1,2 dimethoxyethane (DME) ranging in percent ratios of (DIOX:DME) from 100/0 to 40/60 by weight, have low specific resistivity. $Li/TiS_2$ cells containing these electrolytes, therefore, may be operated at high rates.

The following tables (Tables 1 and 2) illustrate the specific resistivity of various electrolyte solute/solvent combinations, which specific resistivities approach those of aqueous solutions:

TABLE 1

SPECIFIC RESISTIVITY DATA
FOR $LiAsF_6$—DIOX—DME ELECTROLYTE*
ELECTROLYTE COMPOSITION AND
SPECIFIC RESISTIVITY (25° C.)

| $LiAsF_6$ DIOX | Specific Resistivity Ω Cm | $LiAsF_6$ DIOX—DME 80/20 | Specific Resistivity Ω Cm |
|---|---|---|---|
| 1 M | 93 | 1 M | 57 |
| 2 M | 59 | 2 M | 53 (49) |
| 2.5 M | 65 | 2.5 M | 52 (48.5) |
| 3 M | — | 3.0 M | 64 |

*Dioxolane distilled over sodium metal, reagent grade DME, and high purity $LiAsF_6$ were used in the solution preparations.

TABLE 2

SPECIFIC RESISTIVITY DATA OF $LiPF_6$,
$LiBF_4$—DIOX—DME 80:20 V/O ELECTROLYTE
(Solutions Treated With
$Li_2CO_3$ as Acidity Scavenger)

| Conc. of Salt | Sp. Resistivity (Ω Cm) @ 23° C. | |
|---|---|---|
| M/L | $LiPF_6$ | $LiBF_4$ |
| 1.0 | 84 | 416 |
| 1.5 | 67 | 268 |

TABLE 2-continued
SPECIFIC RESISTIVITY DATA OF LiPF$_6$, LiBF$_4$—DIOX—DME 80:20 V/O ELECTROLYTE
(Solutions Treated With Li$_2$CO$_3$ as Acidity Scavenger)

| Conc. of Salt M/L | Sp. Resistivity (Ω Cm) @ 23° C. | |
|---|---|---|
| | LiPF$_6$ | LiBF$_4$ |
| 2.0 | 63 | 197 |
| 2.5 | 59 | 167 |
| 3.0 | 49 | 144 |
| 3.5 | — | 140 |
| 4.0 | — | 154 |

In general, electrolytes having an aqueous pH of 6.00 or better exhibited greater stability and shelf life than counterpart solutions of greater acidity.

Referring to FIGS. 1a, 1b, and 1c, a graphical representation of the efficiencies realized for cathode-limiting Li/TiS$_2$ cells (anode:cathode::3:1) at various current densities operating in different electrolytes, is shown.

It is seen from these figures that high rate capability (<10-hour rate) is feasible with >60% material utilization in many solutions of LiAsF$_6$.DIOX.DME.

The rechargeability or cyclability of Li/TiS$_2$ bag cells of standard 1"×1" electrode parallel-plate prismatic configuration is illustrated in Table 3 below:

TABLE 3
Li/TiS$_2$ Cell Cycling Data in LiAsF$_6$.DIOX.DME.Electrolyte @ 25° C.

| | | Electrolyte | | | | | |
|---|---|---|---|---|---|---|---|
| TiS$_2$ mAh | LiAsF$_6$ M/L | DIOX DME (V/O) | Current mA | Discharge to 1.4 V M.U. % / Cycle # | to M.U. % / Cycle # | F,O,M,Li | Other Information |
| 120.6 | 2.0 M | 80:20 | 25 | 94/1 | 51.8/68 | 9.42 | 2-Anode, 1-Cathode Cell, 600 mAh Li |
| | | | 15 | 51.9/69 | 35/134 | 15.0 | |
| | | | 12 | 40/135 | 43.8/144 | 15.75 | |
| | | | 10 | 36.7/217 | | 21.75 | |
| 120.6 | 2.5 M | 80:20 | 65 | 76.2/2 | 43.8/91 | 9.68 | 2-Anode, 1-Cathode Cell, 600 mAh Li |
| | | | 32.5 | 44.3/92 | 41.2/102 | 10.66 | |
| | | | 15 | 51.2/104 | 42.7/179 | 18.3 | |
| | | | 10 | 44.4/229 | | 22.6 | |
| 123 | 2.5 M | 80:20 | 10 | 80.2/2 | 54/39 | 13.37 | 1-Anode, 1-Cathode Cell, 300 mAh Li |
| 114 | 2.5 M | 80:20 | 65 | 80.4/2 | 41.3/23 | 2.73 | 2-Anode, 1-Cathode, 600 mAh Li |
| | | | 32.5 | 60.3/24 | 18.4/65 | 5.47 | |
| | | | 15 | 45.2/66 | 41.6/117 | 11.6 | |
| 120.6 | 2.5 M | 50:50 | 65 | 74.1/1 | 27/55 | 4.28 | 2-Anode, 1-Cathode, 600 mAh Li |
| | | | 32.5 | 66.5/56 | 21.1/163 | 11.8 | |
| | | | 15 | 39.4/164 | 28/177 | 12.68 | |
| 114 | 3.0 M | 80:20 | 11.4 | 73/2 | 50.5/57 | 11.85 | 1-Anode, 1-Cathode, 300 mAh Li |
| | | | 10 | 55.0/78 | | 15.6 | |
| 112 | 3.0 M | 70:30 | 65 | 78.8/1 | 36.5/13 | 1.31 | 2-Anode, 1-Cathode, 600 mAh Li |
| | | | 32.5 | 32.5/14 | 28.5/28 | 2.41 | |
| | | | 15 | 49/29 | 37.5/109 | 10.58 | |
| | | | 11.2 | 42.2/110 | 43.7/117 | 11.23 | |

Li/TiS$_2$ Cell Cycling Data in LiAsF$_6$.DIOX.DME.Electrolyte Electrolyte @ 50° C.

| | | Electrolyte | | | | | |
|---|---|---|---|---|---|---|---|
| TiS$_2$ mAh | LiAsF$_6$ M/L | DIOX DME (V/O) | Current mA | Discharge to 1.7 V M.U. % / Cycle # | to M.U. % / Cycle # | F,O,M,Li | Other Information |
| 99.4 | 2.5 M | 80:20 | 65 | 85.0/1 | 68.8/25 | 2.9 | 2-Anode, 1-Cathode Cell, 600 mAh Li |
| | | | 30 | 77.3/26 | 30.2/143 | 13.3 | |
| | | | 10 | 80.7/144 | 51.5/175 | 16.6 | |

In preparing and handling of these electrolytes, it was observed that solutions of 2.5 M LiAsF$_6$. Dioxolane prepared from undistilled dioxolane and U.S. Steel Co. samples of LiAsF$_6$ did not undergo gelation over a period of four (4) weeks at ~25° C. The above electrolyte exhibited room temperature stability, and appeared to be unaffected by exposure to air in the presence of 2000 ppm of water.

With the controlled addition of LiAsF$_6$ (U.S. Steel Co.) to a DIOX-DME (80/20 V/O) solvent, i.e., controlled to prevent a temperature rise over 30° C., the electrolytes of >3.0 M/L could be prepared and stored at room temperature over a four (4) week period without gelation. Exposure of air, or the addition of 2000 ppm of H$_2$O did not render the electrolyte viscous in approximately 100 hours at 25° C. Solutions were stable to lithium without any change in viscosity over a four (4) week period.

Having thus described the invention, what is desired to be protected by Letters Patent is presented by the following appended claims.

What is claimed is:

1. A current producing electrochemical cell comprising a lithium anode, a titanium disulfide cathode, and an electrolyte having an aqueous pH equal to, or greater than, 6.00, comprising at least one solute of the general formula:

LiXF$_a$ wherein X is selected from a group consisting of B, P, Sb, and As, and wherein a is 4 for B and 6 for P, Sb, and As, in a solvent consisting of at least 1,3 dioxolane.

2. The electrochemical cell of claim 1, wherein said 1,3 dioxolane is mixed with 1,2 dimethoxyethane.

3. The electrochemical cell of claim 2, wherein said 1,3 dioxolane is mixed with said 1,2 dimethoxyethane in a range of ratios of 1,3 dioxolane: 1,2 dimethoxyethane from 100/0 to 40/60 percent by weight.

4. The electrochemical cell of claim 3, wherein said solutes are generally in a range of concentrations between 0.5 and 4.0 molal.

5. The electrochemical cell of claim 3, wherein one of the solutes is preferably $LiAsF_6$.

6. The electrochemical cell of claim 5, wherein the solutes are generally in a range of concentrations between 0.5 and 3.0 molal in a solvent having a ratio of 1,3 dioxolane:1,2 dimethoxyethane of 80/20 percent by weight.

7. The electrochemical cell of claim 1, wherein the current producing electrochemical system is a secondary battery system.

8. The electrochemical cell of claim 7, wherein said secondary battery system is a rechargeable system.

9. The electrochemical cell of claim 1, wherein one of the solutes is preferably $LiAsF_6$.

* * * * *